(12) United States Patent
Robinson et al.

(10) Patent No.: US 9,715,703 B2
(45) Date of Patent: Jul. 25, 2017

(54) SYSTEM, METHOD AND COMPUTER READABLE MEDIUM FOR BILLING BASED ON A DURATION OF SERVICE PERIOD

(71) Applicant: ATS TOLLING LLC, Mesa, AZ (US)

(72) Inventors: Benjamin P. Robinson, Plano, TX (US); Debbie Lemon, Carrollton, TX (US); Sarath K. Balachandran, Irving, TX (US)

(73) Assignee: ATS TOLLING LLC, Mesa, AZ (US)

( * ) Notice: Subject to any disclaimer, the term of this patent is extended or adjusted under 35 U.S.C. 154(b) by 103 days.

(21) Appl. No.: 13/737,272

(22) Filed: Jan. 9, 2013

(65) Prior Publication Data
US 2013/0275188 A1    Oct. 17, 2013

Related U.S. Application Data

(63) Continuation of application No. 12/437,621, filed on May 8, 2009, now Pat. No. 8,374,909, which is a
(Continued)

(51) Int. Cl.
*G06Q 20/14*     (2012.01)
*G06Q 30/02*     (2012.01)
(Continued)

(52) U.S. Cl.
CPC ....... *G06Q 30/0284* (2013.01); *G06Q 20/102* (2013.01); *G06Q 20/14* (2013.01);
(Continued)

(58) Field of Classification Search
CPC ........................................................ G06Q 20/14
(Continued)

(56) References Cited

U.S. PATENT DOCUMENTS 4,510,495 A    4/1985   Sigrimis et al.
4,546,241 A   10/1985   Walton
(Continued)

FOREIGN PATENT DOCUMENTS

CA    2636507 A1    7/2007
EP    0780801 A1    6/1997
(Continued)

OTHER PUBLICATIONS

U.S. Appl. No. 11/516,380, Robinson et al.
(Continued)

*Primary Examiner* — Akiba Allen
(74) *Attorney, Agent, or Firm* — Stoel Rives LLP

(57) ABSTRACT

A system, method, and computer readable medium for billing based on a duration of a service period, comprises sending fleet data from a third party entity to a toll authority via a toll rental entity, matching toll data with the fleet data by the toll authority, if the toll data matches the fleet data: charging an account by the toll authority and sending the matched data to the toll rental entity, determining, by the toll rental entity, if the sent matched data is related to an opt-in for duration based tolling or an opt-out for duration based tolling, if the sent matched data is related to an opt-in for duration based tolling, charging the third party entity for the duration based tolling, and if the sent matched data is related to an opt-out for duration based tolling, applying at least one of: a fee for the duration based tolling, a toll usage amount, a service fee for the duration based tolling, and a service fee for the toll usage.

20 Claims, 8 Drawing Sheets

Related U.S. Application Data continuation of application No. 11/580,527, filed on Oct. 13, 2006, now Pat. No. 8,195,506.

(60) Provisional application No. 60/726,300, filed on Oct. 13, 2005, provisional application No. 60/759,937, filed on Jan. 18, 2006, provisional application No. 60/763,097, filed on Jan. 27, 2006.

(51) Int. Cl.
    *G06Q 20/10*     (2012.01)
    *G06Q 20/28*     (2012.01)
    *G06Q 30/04*     (2012.01)
    *G07B 15/02*     (2011.01)

(52) U.S. Cl.
    CPC .............. *G06Q 20/28* (2013.01); *G06Q 30/04* (2013.01); *G07B 15/02* (2013.01)

(58) Field of Classification Search
    USPC .................................... 705/13, 1.1, 26.1, 40
    See application file for complete search history.

(56) References Cited

U.S. PATENT DOCUMENTS

| | | | |
|---|---|---|---|
| 4,665,395 A | 5/1987 | Van Ness | |
| 5,086,389 A | 2/1992 | Hassett et al. | |
| 5,263,118 A | 11/1993 | Cornelison | |
| 5,310,999 A | 5/1994 | Claus et al. | |
| 5,381,155 A | 1/1995 | Gerber | |
| 5,396,417 A | 3/1995 | Burks et al. | |
| 5,485,520 A | 1/1996 | Chaum et al. | |
| 5,525,991 A | 6/1996 | Nagura et al. | |
| 5,602,919 A | 2/1997 | Hurta | |
| 5,805,209 A | 9/1998 | Yuge et al. | |
| 5,809,480 A | 9/1998 | Chasek | |
| 5,819,234 A | 10/1998 | Slavin et al. | |
| 5,825,007 A | 10/1998 | Jesadanont | |
| D403,856 S | 1/1999 | Dobbins | |
| 5,935,190 A | 8/1999 | Davis | |
| 5,948,038 A | 9/1999 | Daly | |
| 5,991,749 A | 11/1999 | Morrill, Jr. | |
| 6,052,068 A | 4/2000 | Price R-W et al. | |
| 6,087,963 A | 7/2000 | Kobayashi et al. | |
| 6,111,523 A | 8/2000 | Mee | |
| 6,163,277 A | 12/2000 | Gehlot | |
| 6,175,800 B1 | 1/2001 | Mori et al. | |
| 6,181,259 B1 | 1/2001 | Yamashita | |
| 6,191,705 B1 | 2/2001 | Oomen et al. | |
| 6,195,019 B1 | 2/2001 | Nagura | |
| 6,198,913 B1 | 3/2001 | Sung et al. | |
| 6,198,987 B1 | 3/2001 | Park et al. | |
| 6,218,963 B1 | 4/2001 | Kawanabe et al. | |
| 6,233,519 B1 | 5/2001 | Yamada | |
| 6,243,029 B1 | 6/2001 | Tomer | |
| 6,252,523 B1 | 6/2001 | Mostrom | |
| 6,252,524 B1 | 6/2001 | Takikita | |
| 6,275,552 B1 | 8/2001 | Ando | |
| 6,278,935 B1 | 8/2001 | Kaplan et al. | |
| 6,285,858 B1 | 9/2001 | Yoshida | |
| 6,300,882 B1 | 10/2001 | Inoue | |
| 6,308,893 B1 | 10/2001 | Waxelbaum et al. | |
| 6,317,721 B1 | 11/2001 | Hurta et al. | |
| 6,326,900 B2 | 12/2001 | DeLine et al. | |
| 6,337,639 B1 | 1/2002 | Kojima | |
| 6,340,934 B1 | 1/2002 | Hisada | |
| 6,342,844 B1 | 1/2002 | Rozin | |
| 6,344,806 B1 | 2/2002 | Katz | |
| 6,347,739 B1 | 2/2002 | Tamam | |
| 6,373,402 B1 | 4/2002 | Mee | |
| 6,388,579 B1 | 5/2002 | Adcox et al. | |
| 6,390,365 B1 | 5/2002 | Karasawa | |
| 6,390,429 B1 | 5/2002 | Brincat | |
| 6,396,418 B2 | 5/2002 | Naito | |
| 6,411,889 B1 | 6/2002 | Mizunuma et al. | |
| 6,437,706 B2 | 8/2002 | Sato et al. | |
| 6,446,049 B1 | 9/2002 | Janning et al. | |
| 6,449,555 B1 | 9/2002 | Ohba et al. | |
| 6,459,385 B2 | 10/2002 | Yamashita | |
| 6,463,384 B1 | 10/2002 | Kaplan et al. | |
| 6,490,443 B1 | 12/2002 | Freeny, Jr. | |
| 6,509,843 B1 | 1/2003 | Fuyama | |
| 6,538,580 B2 | 3/2003 | Bostrom et al. | |
| 6,542,815 B1 | 4/2003 | Ishizaki et al. | |
| 6,546,119 B2 | 4/2003 | Ciolli et al. | |
| 6,603,406 B2 | 8/2003 | Jambhekar et al. | |
| 6,642,851 B2 | 11/2003 | Deline et al. | |
| 6,653,946 B1 | 11/2003 | Hassett | |
| 6,658,392 B2 | 12/2003 | Yoshida | |
| 6,658,775 B1 | 12/2003 | Lanzisero | |
| 6,661,352 B2 | 12/2003 | Tiernay et al. | |
| 6,683,580 B2 | 1/2004 | Kuramoto | |
| 6,683,956 B1 | 1/2004 | Aikawa et al. | |
| 6,684,155 B1 | 1/2004 | Chen et al. | |
| 6,705,521 B1 | 3/2004 | Wu et al. | |
| 6,725,202 B1 | 4/2004 | Hurta et al. | |
| 6,737,986 B2 | 5/2004 | Fuyama | |
| 6,744,377 B1 | 6/2004 | Inoue | |
| 6,754,369 B1 | 6/2004 | Sazawa | |
| 6,756,915 B2 | 6/2004 | Choi | |
| 6,774,810 B2 | 8/2004 | Deline | |
| 6,791,475 B2 | 9/2004 | Yamashita | |
| 6,796,499 B1 | 9/2004 | Wang | |
| 6,816,707 B1 | 11/2004 | Barker et al. | |
| 6,834,267 B1 | 12/2004 | Fuyama | |
| 6,856,820 B1 | 2/2005 | Kolls | |
| 6,883,710 B2 | 4/2005 | Chung | |
| D505,916 S | 6/2005 | Hilton | |
| 6,909,876 B2 | 6/2005 | Higashino et al. | |
| 6,920,379 B2 | 7/2005 | Miyamoto | |
| 6,937,162 B2 | 8/2005 | Tokitsu et al. | |
| 6,985,827 B2 | 1/2006 | Williams et al. | |
| 7,053,793 B2 | 5/2006 | Tajima et al. | |
| 7,080,070 B1 | 7/2006 | Gavarini | |
| 7,104,447 B1 | 9/2006 | Lopez et al. | |
| D535,722 S | 1/2007 | Nimberger | |
| 7,970,644 B2 | 6/2011 | Hedley et al. | |
| D704,243 S | 5/2014 | Ikegame | |
| D728,481 S | 5/2015 | Schulte | |
| 2001/0019307 A1 | 9/2001 | Sato et al. | |
| 2001/0025251 A1 | 9/2001 | Konishi et al. | |
| 2001/0026228 A1 | 10/2001 | Naito | |
| 2001/0052880 A1 | 12/2001 | Kuramoto | |
| 2002/0002534 A1 | 1/2002 | Davis et al. | |
| 2002/0004741 A1 | 1/2002 | Yoshida | |
| 2002/0008638 A1 | 1/2002 | Yamashita | |
| 2002/0018005 A1 | 2/2002 | Fuyama | |
| 2002/0032506 A1 | 3/2002 | Tokitsu et al. | |
| 2002/0046128 A1 | 4/2002 | Abe et al. | |
| 2002/0052837 A1 | 5/2002 | Bouthors | |
| 2002/0067291 A1 | 6/2002 | Ikeda | |
| 2002/0072963 A1 | 6/2002 | Jonge | |
| 2002/0080048 A1 | 6/2002 | Choi | |
| 2002/0089431 A1 | 7/2002 | Fuyama | |
| 2002/0097178 A1 | 7/2002 | Thomas et al. | |
| 2002/0105440 A1 | 8/2002 | Bostrom et al. | |
| 2002/0111851 A1 | 8/2002 | Folkers | |
| 2002/0115410 A1 | 8/2002 | Higashino et al. | |
| 2002/0145039 A1 | 10/2002 | Carroll | |
| 2002/0145542 A1 | 10/2002 | Yamashita | |
| 2002/0178050 A1 | 11/2002 | Sone | |
| 2002/0186144 A1 | 12/2002 | Meunier | |
| 2002/0194137 A1 | 12/2002 | Park et al. | |
| 2002/0198767 A1 | 12/2002 | Kim | |
| 2003/0001755 A1 | 1/2003 | Tiernay et al. | |
| 2003/0026430 A1 | 2/2003 | Aikawa et al. | |
| 2003/0033083 A1 | 2/2003 | Nakashima et al. | |
| 2003/0046145 A1 | 3/2003 | Miao | |
| 2003/0050038 A1 | 3/2003 | Haave et al. | |
| 2003/0067396 A1 | 4/2003 | Hassett | |
| 2003/0069784 A1 | 4/2003 | Banerjee et al. | |
| 2003/0098800 A1 | 5/2003 | Jambhekar et al. | |
| 2003/0105662 A1 | 6/2003 | Koketsu et al. | |

(56) References Cited

U.S. PATENT DOCUMENTS

| | | |
|---|---|---|
| 2003/0109223 A1 | 6/2003 | Toyama |
| 2003/0110075 A1 | 6/2003 | Shioda et al. |
| 2003/0112125 A1 | 6/2003 | Saegrov |
| 2003/0115095 A1 | 6/2003 | Yamauchi |
| 2003/0125981 A1 | 7/2003 | Pedrazzoli Pazos |
| 2003/0189498 A1 | 10/2003 | Kakihara et al. |
| 2003/0200227 A1 | 10/2003 | Ressler |
| 2004/0004120 A1 | 1/2004 | Kojima |
| 2004/0008514 A1 | 1/2004 | Lee et al. |
| 2004/0019412 A1 | 1/2004 | Miyamoto |
| 2004/0046019 A1 | 3/2004 | Kojima |
| 2004/0083130 A1 | 4/2004 | Posner et al. |
| 2004/0140355 A1 | 7/2004 | Grison |
| 2004/0146272 A1 | 7/2004 | Kessel et al. |
| 2004/0153401 A1 | 8/2004 | Gila et al. |
| 2004/0161097 A1 | 8/2004 | Henry |
| 2004/0162788 A1 | 8/2004 | Sakamoto |
| 2004/0174272 A1 | 9/2004 | Lin |
| 2004/0178929 A1 | 9/2004 | Toyama |
| 2004/0206817 A1 | 10/2004 | Grant |
| 2004/0212518 A1 | 10/2004 | Tajima et al. |
| 2004/0227616 A1 | 11/2004 | Lafferty |
| 2004/0236685 A1 | 11/2004 | Gila |
| 2004/0245302 A1 | 12/2004 | McNicholas |
| 2004/0263356 A1 | 12/2004 | Wu et al. |
| 2004/0266500 A1 | 12/2004 | Gila et al. |
| 2005/0005488 A1 | 1/2005 | Burke |
| 2005/0010478 A1 | 1/2005 | Gravelle |
| 2005/0033505 A1 | 2/2005 | Zatz |
| 2005/0034340 A1 | 2/2005 | Burke |
| 2005/0040221 A1 | 2/2005 | Schwarz, Jr. |
| 2005/0071175 A1 | 3/2005 | Gila et al. |
| 2005/0075836 A1 | 4/2005 | Taylor |
| 2005/0086100 A1 | 4/2005 | Yanagisawa et al. |
| 2005/0097018 A1 | 5/2005 | Takida |
| 2005/0102211 A1 | 5/2005 | Freeny |
| 2005/0116838 A1 | 6/2005 | Bachelder et al. |
| 2005/0119010 A1 | 6/2005 | Yasukawa |
| 2005/0157677 A1 | 7/2005 | Dowling |
| 2005/0159133 A1 | 7/2005 | Hasan et al. |
| 2005/0168351 A1 | 8/2005 | Saze et al. |
| 2005/0168352 A1 | 8/2005 | Tomer |
| 2005/0169227 A1 | 8/2005 | Dowling |
| 2005/0169228 A1 | 8/2005 | Dowling |
| 2005/0170824 A1 | 8/2005 | Dowling |
| 2005/0170825 A1 | 8/2005 | Dowling |
| 2005/0179522 A1 | 8/2005 | Saegrov |
| 2005/0187701 A1 | 8/2005 | Baney |
| 2005/0195841 A1 | 9/2005 | Dowling |
| 2005/0195842 A1 | 9/2005 | Dowling |
| 2005/0197976 A1* | 9/2005 | Tuton ................ G06Q 30/0284 705/417 |
| 2005/0198199 A1 | 9/2005 | Dowling |
| 2005/0203892 A1 | 9/2005 | Wesley et al. |
| 2005/0216187 A1 | 9/2005 | Hartinger |
| 2005/0270178 A1 | 12/2005 | Ioli |
| 2005/0279831 A1 | 12/2005 | Robinson et al. |
| 2006/0143104 A1 | 6/2006 | Wagonheim |
| 2006/0237528 A1 | 10/2006 | Bishop et al. |
| 2006/0289621 A1 | 12/2006 | Foss et al. |
| 2007/0026842 A1 | 2/2007 | Haave et al. |
| 2007/0100745 A1 | 5/2007 | Keiser et al. |
| 2007/0124197 A1 | 5/2007 | Robinson et al. |
| 2007/0124198 A1 | 5/2007 | Robinson et al. |
| 2007/0124199 A1 | 5/2007 | Robinson et al. |
| 2007/0126601 A1 | 6/2007 | Park |
| 2007/0192177 A1 | 8/2007 | Robinson et al. |
| 2007/0252678 A1 | 11/2007 | Garcia Alonso et al. |
| 2007/0299721 A1 | 12/2007 | Robinson et al. |
| 2008/0040210 A1 | 2/2008 | Hedley |
| 2008/0062009 A1 | 3/2008 | Marton |
| 2008/0062472 A1 | 3/2008 | Garg et al. |
| 2008/0077417 A1 | 3/2008 | Lazzarino et al. |
| 2008/0248819 A1 | 10/2008 | Smith et al. |
| 2008/0249936 A1 | 10/2008 | Miller et al. |
| 2008/0270226 A1 | 10/2008 | Archibald |
| 2009/0089156 A1 | 4/2009 | Robinson et al. |
| 2009/0146845 A1 | 6/2009 | Hedley |
| 2009/0195651 A1 | 8/2009 | Leonard et al. |
| 2009/0228350 A1 | 9/2009 | Robinson et al. |
| 2010/0023452 A1 | 1/2010 | Brown |
| 2013/0253997 A1 | 9/2013 | Robinson et al. |
| 2014/0117096 A1 | 5/2014 | Heimlicher |
| 2014/0149190 A1 | 5/2014 | Robinson et al. |
| 2014/0244492 A1 | 8/2014 | Balachandran |
| 2014/0289024 A1 | 9/2014 | Robinson et al. |
| 2016/0125665 A1 | 5/2016 | Robinson et al. |

FOREIGN PATENT DOCUMENTS

| | | |
|---|---|---|
| EP | 0784297 A2 | 7/1997 |
| GB | 2414336 A | 11/2005 |
| JP | 2004213569 | 7/2004 |
| JP | 2004227259 A | 8/2004 |
| WO | WO-2007044960 A2 | 4/2007 |

OTHER PUBLICATIONS

U.S. Appl. No. 11/516,379, Robinson.
U.S. Appl. No. 11/651,414, Robinson et al.
U.S. Appl. No. 11/580,527, Robinson.
U.S. Appl. No. 11/810,751, Robinson et al.
U.S. Appl. No. 11/640,550, Robinson et al.
U.S. Appl. No. 11/640,586, Robinson et al.
U.S. Appl. No. 11/803,933, Robinson et al.
U.S. Appl. No. 11/810,752, Robinson et al.
U.S. Appl. No. 11/985,985, Robinson et al.
U.S. Appl. No. 11/903,687, Robinson et al.
U.S. Appl. No. 12/268,680, Balachandran et al.
U.S. Appl. No. 12/437,621, Robinson et al.
U.S. Appl. No. 12/433,954, Robinson et al.
U.S. Appl. No. 12/433,479, Robinson et al.
U.S. Appl. No. 12/437,782, Robinson et al.
U.S. Appl. No. 13/714,961, Balachandran.
"Overview of Meeting Proceedings", 2004 IBTTA Technology Committee, Spring Technology Workshop, Miami, Florida, USA, (4 pages).
Dick Schnacke, "The 5.9 GHz DSRC Prototype Development Program", IBTTA Technology Workshop, Madrid, Spain, Nov. 14, 2004, (37 pages).
Mehmood, Jennifer, "International Search Report for PCT/US2007/011816" as mailed Jun. 2, 2008 (3 pages).
Young, Lee W."International Search Report for PCT/US 08/10258" as mailed Nov. 10, 2008 (3 pages).
Copenheaver, Blaine R., "International Search Report" for PCT/US2009/060352 as mailed Dec. 10, 2009, (4 pages).
Fernandez, Paneda, J., "Supplementary European Search Report", Nov. 5, 2009, (4 pages).
Astarita, Vittorio et al., "The use of Mobile Phones in Traffic Management and Contol", 2001 IEEE Intelligent Transportation Systems Conference Proceedings, Oakland, CA, Aug. 25-29, 2001, pp. 10-15.
"Toll Ring System; Oslo, Norway", www.eltis.org/studies/leda17.htm; retrieved Dec. 27, 2002 using archive.org., 4 pages.
Yee, Sonya, "Iron Curtain Still Bars The Road East", Oct. 19, 1998, European, p. 18, pp. 1-4.
ProQuest, "Dollar and Thrifty Keep Customers Moving with Pass24(TM)", PR Newswire, New York, Sep. 18, 2006, 2 pages.
IBM Corp.; "Introduction to Replication and Event Publishing"; IBM Information Integration, Version 9.5; 2004; 68 pages.
Connors, Jim, et al.; "Security Increases with Season for Shoplifting"; St. Joseph News; St. Joseph, MO; Nov. 30, 2005; 2 pages.
PCT/US2005/016376, International Search Report and Written Opinion, Aug. 30, 2016, 7 pages.
PCT/US2006/034534, International Search Report and Written Opinion, Sep. 18, 2007, 6 pages.
U.S. Appl. No. 13/894,501, Final Office Action, Apr. 13, 2017, 36 pages.

(56) References Cited

OTHER PUBLICATIONS

U.S. Appl. No. 14/471,300, Non-Final Office Action, Apr. 21, 2017, 53 pages.
U.S. Appl. No. 14/268,357, Non-Final Office Action, May 31, 2017 16 pages.

* cited by examiner

SYSTEM, METHOD AND COMPUTER READABLE MEDIUM FOR BILLING BASED ON A DURATION OF SERVICE PERIOD

CROSS-REFERENCE TO RELATED APPLICATIONS

This patent application is a continuation of U.S. patent application Ser. No. 12/437,621, filed on May 8, 2009. U.S. patent application Ser. No. 12/437,621 is a continuation of U.S. patent application Ser. No. 11/580,527, filed on Oct. 13, 2006 which is now U.S. Pat. No. 8,195,506. U.S. patent application Ser. No. 11/580,527 claims priority from U.S. Provisional Patent Application No. 60/726,300, titled Toll Fee System And Method Using Prepaid Toll Pass, filed on Oct. 13, 2005, U.S. Provisional Patent Application No. 60/759,937, titled Business Process For Toll Fee System And Method For Vehicle Registration, Invoicing, Opt-In Services, And Toll Violations, filed on Jan. 18, 2006, and U.S. Provisional Patent Application No. 60/763,097 titled Method And System For Toll Collection With Optional Service Capabilities, filed on Jan. 27, 2006. U.S. patent application Ser. Nos. 12/437,621, 11/580,527, U.S. Provisional Patent Application No. 60/726,300, U.S. Provisional Patent Application No. 60/759,937, and U.S. Provisional Patent Application No. 60/763,097 are incorporated herein by reference. U.S. Pat. No. 7,407,097, titled Toll Fee System And Method, U.S. Non-Provisional patent application Ser. No. 11/516,376, titled System, Method, And Computer Readable Medium For Billing, filed on Sep. 6, 2006, and U.S. Non-Provisional patent application Ser. No. 11/516,380, titled System, Method, And Computer Readable Medium For Billing Tolls, filed on Sep. 6, 2006, are incorporated herein by reference.

BACKGROUND OF THE INVENTION

The present invention relates generally to toll systems and methods and, more particularly, but not by way of limitation, to systems, methods, and computer readable media for billing based on a duration of a service period.

BRIEF SUMMARY OF THE INVENTION

The present invention incorporates by reference various information including: toll fee tracking systems and methods for automatic, non-contact, high-speed toll fee tracking and payment of vehicular tolls using a Pre-authorized Toll Pass, business processes for toll fee system and method for vehicle registration, invoicing, opt-in services, and toll violations, and to toll service systems and methods adapted to provide toll service to third party entity vehicles without having to stop at a toll authority. In such a scenario, a toll rental entity gathers all third party entity vehicle information such as, for example, license plate number, vehicle registration state, vehicle make, vehicle model and the like from third party entities to provide toll service to the third party entity vehicles. When a third party entity customer rents a third party entity vehicle with the toll rental service option, the toll rental entity receives such notification as opt-in service transaction from the third party entity and communicates the information back to the toll authority/toll collection entity to support the service for the third party entity vehicle. If the customer is not opted for this service and violated the toll authority/toll collection entity by not paying at the toll authority/toll collection entity, then the toll authority/toll collection entity identifies third party vehicles by license plate number. The toll rental entity will then communicate with the third party entity to obtain rental violator information for later violation processing. Instead of charging the customer by toll usage, embodiments of the present invention charge the customer by the rental period.

In one embodiment of the present invention, a method for billing based on a duration of a service period, comprises sending fleet data from a third party entity to a toll authority via a toll rental entity, matching toll data with the fleet data by the toll authority, if the toll data matches the fleet data: charging an account by the toll authority and sending the matched data to the toll rental entity, determining, by the toll rental entity, if the sent matched data is related to an opt-in for duration based tolling or an opt-out for duration based tolling, if the sent matched data is related to an opt-in for duration based tolling, charging the third party entity for the duration based tolling, and if the sent matched data is related to an opt-out for duration based tolling, applying at least one of a fee for the duration based tolling, a toll usage amount, a service fee for the duration based tolling, and a service fee for the toll usage.

In another embodiment of the present invention, a system for billing based on a duration of a service period, comprises a toll authority, and a toll rental entity, wherein the toll rental entity sends a payment to the toll authority irrespective of toll usage.

In a further embodiment of the present invention, a computer readable medium comprises instructions for capturing toll usage, validating the toll usage, sending the validated toll usage, and receiving a payment based on the validated toll usage for an opt-out service period related to a rented transport.

In yet another embodiment of the present invention, a computer readable medium comprises instructions for: capturing toll usage, validating the toll usage, sending the validated toll usage, and sending the validated toll usage for an opt-out service period related to a rented transport.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION OF THE INVENTION

Embodiment(s) of the invention will now be described more fully with reference to the accompanying Drawings. The invention may, however, be embodied in many different forms and should not be construed as limited to the embodiment(s) set forth herein. The invention should only be considered limited by the claims as they now exist and the equivalents thereof.

Figure 1:
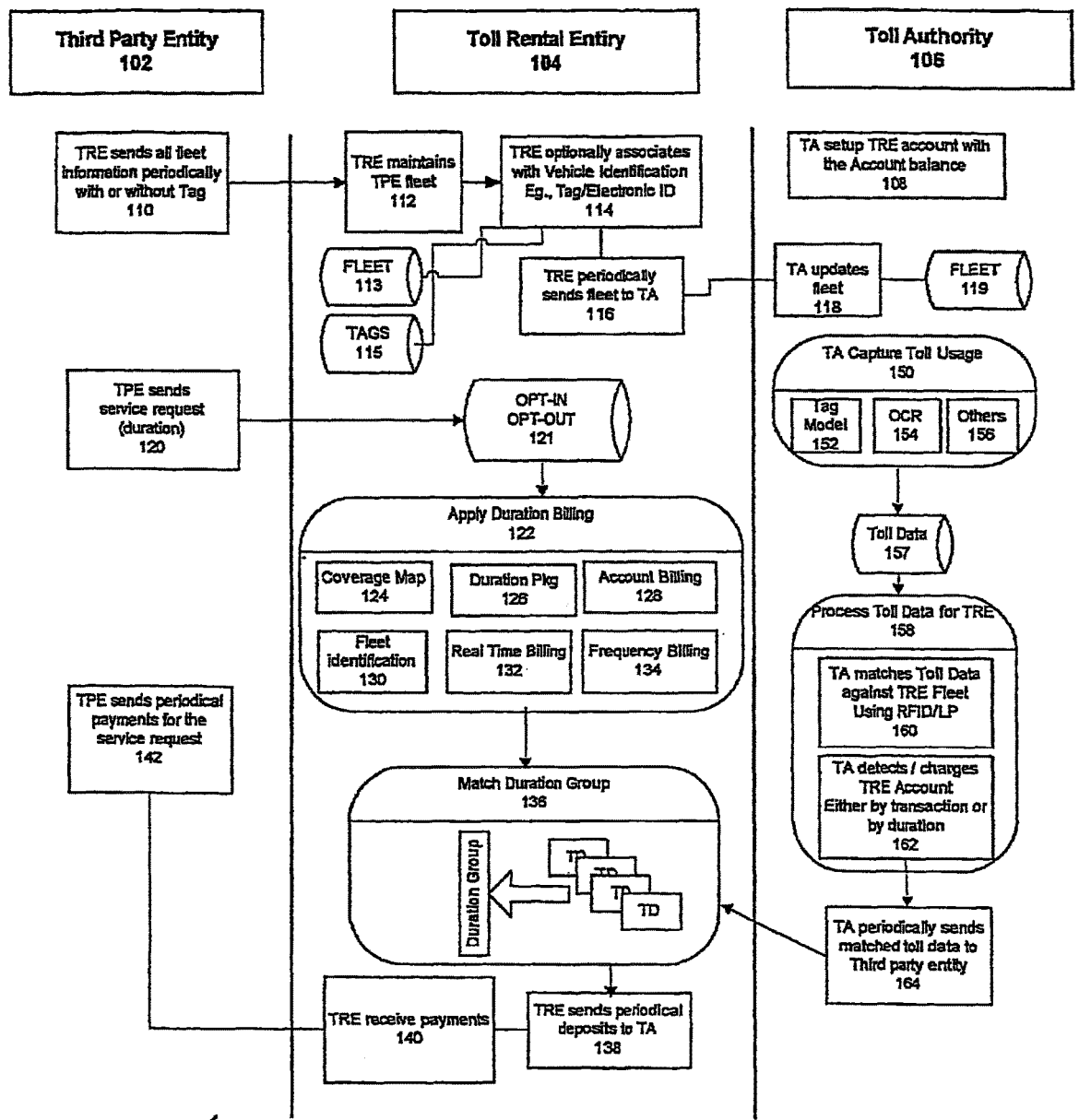
FIG. 1 is a system diagram depicting messages sent between a third party entity, a toll rental entity, and a toll authority in accordance with an embodiment of the present invention.

Referring now to FIG. 1, a flow diagram 100 is illustrated. The depicted messages are sent and received by a number of entities or modules including a third party entity 102 (such as a rent-a-car or other transport rental company), a toll rental entity 104, and a toll authority 106. The flow diagram 100 demonstrates duration based billing for third party vehicles for toll services. Third party vehicles enroll for the toll services by establishing a communication between the third party system and the toll rental entity system. Once the communication is established, the toll rental entity 104 receives fleets/vehicles that will be used for toll services from the third party entity 102. When the third party entity vehicles uses the toll services at the toll facility/plaza, toll authority 106 captures the toll usage 150 using methods such as RFID reader for transponder 152, OCR and camera for license plate recognition 154 and any other future mechanism 156 (manual, 5.6 GHZ etc.).

Toll rental entity 104 enables rental vehicle for toll service either by receiving third party vehicles or by receiving rental agreements or service requests. Third party vehicles can be dynamically associated 114 with any vehicle identification method such as an RFID transponder and/or license plate recognition. Some vehicles may support multiple vehicle identifications at the various toll authority locations. Toll rental entity 104 might or might not periodically send third party vehicle information 116 to the toll authority 104. If the toll authority receives the periodical updates 118 from the toll rental entity, the toll authority might check for the vehicle authentication using fleet database 119 before the toll usage is sent to the third party entity.

The third party entity 102 sends the duration based service request 120 to the third party entity with dynamic association of an RFID vehicle tag or by the license plate with the service contract information. The third party entity applies duration based billing rule 121 and saves the service request in the opt-in/opt-out database. Coverage map 124 defines the service request coverage area. If the renter subscribed for a particular local only, the subscribed location will be treated as an opt-in and the rest of the location will be treated as an opt-out.

Duration Package 126 applies the duration billing rule and breaks the service request into different components called duration groups 136 which can be created by peak time service charge, off time service charges, etc. For example 6 AM-9 AM may be charged at a higher price due to high traffic whereas the rest of the time it will be charged at a lower price. Account Billing 128 applies billing rules such as prepaid or post paid account business rules for the request, fleet Identification 130 applies the dynamic different billing models based on the vehicle identification type. Electronic toll collection using RFID transponder might be charged at a higher price due to additional inventory management whereas OCR based might be charged at a lower price.

Real Time Billing 132 applies real billing on the toll usage. Once the pre-authorized toll consumption is over, billing rules are applied either to stop the service or provide the service with an extra fee. Frequency based billing 134 applies rules such as tracking the frequency of toll usage or consumption and provides the discounts and other promotional offers for the toll services.

Figure 2:
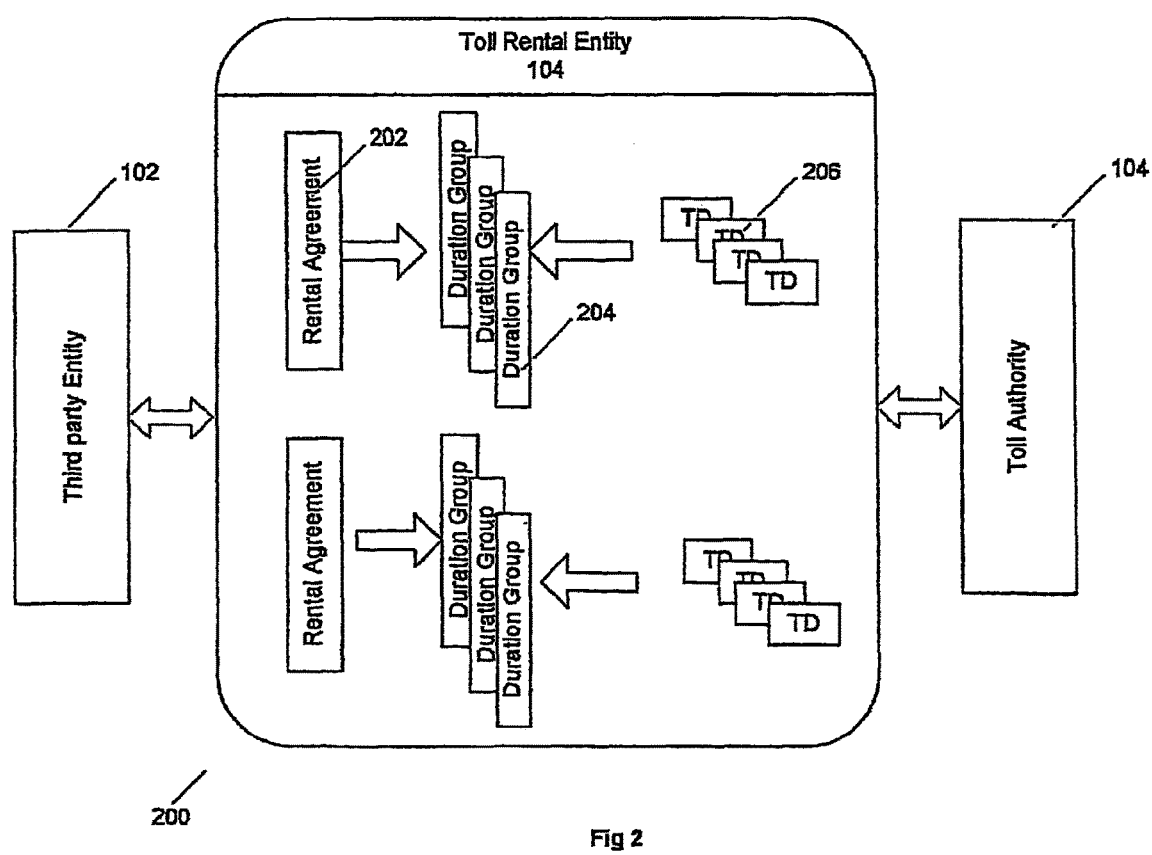
FIG. 2 is another system diagram depicting actions performed by a toll rental entity in accordance with an embodiment of the present invention.

Referring now FIG. 2, a toll rental entity breaks the service request or rental agreement 202 into various duration groups. This can be achieved at the rental begin time or at the rental end time. Toll rental entity 104 maps all the toll usage received from the toll authority into the duration groups 204. The third party entity 102 sends the deposit or payments 138 to the toll authority based on the service request if the toll authority is signed for the duration based billing. The third party entity may pay by hour, daily, weekly, etc. Toll rental entity 104 creates service groups for the opt-out customers if there are any toll usages on that period. In such cases there may be additional processing fees that can be applied. The toll rental entity performs the opt-out billing rules such as: late opt-in, on demand opt-in and opt-out and charges the third party entity for the opt-out transactions.

Figure 3:
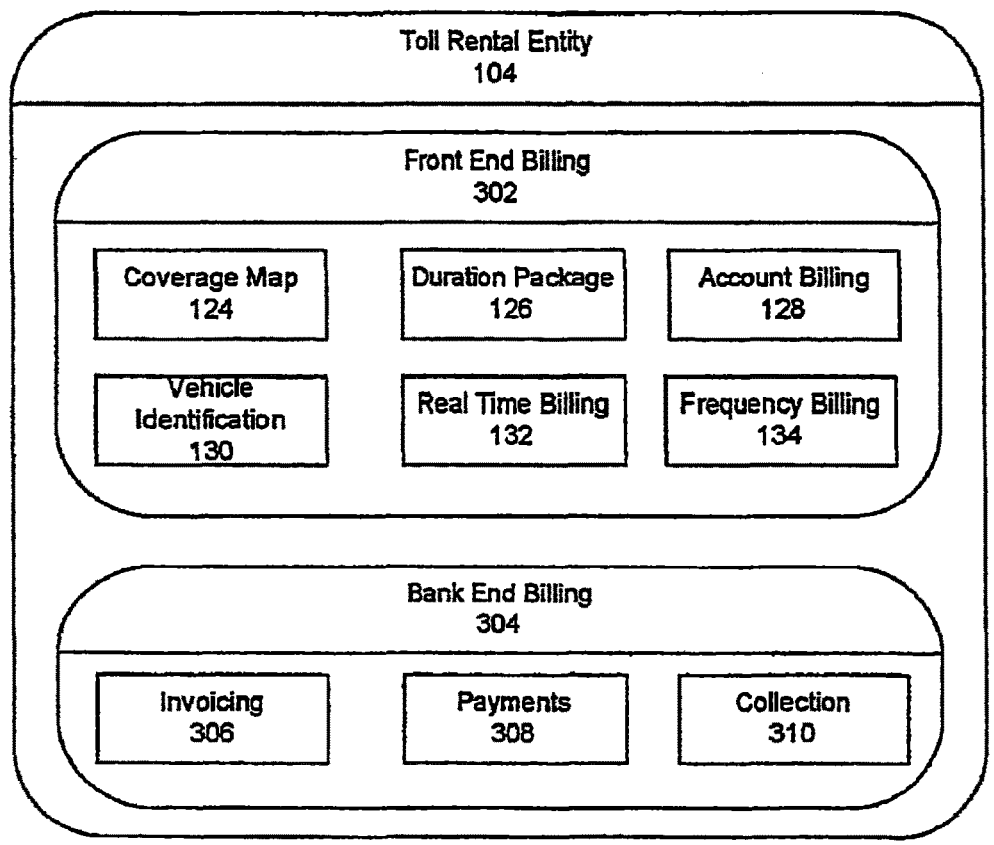
FIG. 3 is a block diagram depicting billing modules in a toll rental entity in accordance with an embodiment of the present invention.

Referring now FIG. 3, the third party entity 104 groups the billing process as two layers, such as front end billing 302 and back end billing 304. Front end billing is performed at the service request level, by opt-in, opt-out, coverage, frequency, duration, vehicle identification etc. Please refer to FIG. 1 for more details. Back end billing is performed at the entity level such as toll authority level or by the third party entity level. All the billable items will be periodically managed through the invoicing, payment and collection processes.

In one embodiment of the present invention, a method for billing based on a duration of a service period, comprises sending fleet data from a third party entity to a toll authority via a toll rental entity, matching toll data with the fleet data by the toll authority, if the toll data matches the fleet data: charging an account by the toll authority and sending the matched data to the toll rental entity, determining, by the toll rental entity, if the sent matched data is related to an opt-in for duration based tolling or an opt-out for duration based tolling, if the sent matched data is related to an opt-in for duration based tolling, charging the third party entity for the duration based tolling, and if the sent matched data is related to an opt-out for duration based tolling, applying at least one of: a fee for the duration based tolling, a toll usage amount, a service fee for the duration based tolling, and a service fee for the toll usage.

The method further comprises sending a disputed status (or a report corresponding to a disputed status) to the toll authority by the toll rental entity based on a dispute with the matched data, and setting up the account by the toll authority with the toll rental entity, wherein the account is at least one of: a prepaid account, a prepaid account with a minimum balance, and a postpaid account, wherein the fleet data includes at least one of: a license plate number, a license plate state, a license state type, an RFID transponder identification, a vehicle identification number, a vehicle owner, a vehicle make, a vehicle model, and a vehicle color. The method also comprises providing a violation by the toll authority if the toll data does not match the fleet data, and sending a service subscription from the third party entity to the toll rental entity based on an activation of the service period, wherein no vehicles, or one or more vehicles, associated with the fleet includes a transponder, and wherein the service period is at least one of: seconds, minutes, hours, days, months, and years. In another embodiment, toll data can be collected prior to the matching of the toll data with the fleet data by the toll authority.

The method further comprises billing based on a duration of a rental period, wherein the rental period is equal to or greater than the service period, wherein the rental period is at least one of: a duration based transport rental service, a pre-authorized transport rental service, a pre-authorized, duration based transport rental service, an unlimited transport rental service, and a location based transport rental service, wherein the service period is related to a toll service, and wherein the toll service is at least one of: a duration based toll service, a pre-authorized toll service, a pre-authorized, duration based toll service, an unlimited toll service, and a location based toll service.

In a further embodiment of the present invention, a computer readable medium, or software of the present invention, comprises instructions for capturing toll usage, validating the toll usage, sending the validated toll usage, and receiving a payment based on the validated toll usage for an opt-out service period related to a rented transport. The computer readable medium further comprises instructions for receiving (for example, by a toll rental entity) the validated toll usage for the opt-out service period and sending customer information related to the opt-out service period (for example, to a toll authority), and charging a customer (for example, by a toll authority) based on the customer information.

In yet another embodiment of the present invention, a computer readable medium comprises instructions for: capturing toll usage (for example, by a toll authority), validating the toll usage (for example, by a toll authority), sending the validated toll usage (for example, by a toll authority to a toll rental entity), and sending the validated toll usage for an opt-out service period related to a rented transport (for example, by a toll rental entity to a third party entity). The computer readable medium further comprises instructions for charging a customer (for example, by the third party entity) based on the validated toll usage, and charging a customer (for example, by the third party entity) based on customer information related to the validated toll usage.

In any of the scenarios above, charges can also be provided based on fees, fines, violations, late payments, unauthorized use or access, insufficient balances, and the like. Also, the coverage area for the service of the present invention can include local, city, inter city, inter state, nation wide, etc., billing can be provided based on capacity (single driver, multiple drivers, multiple passengers) and weight of the rented vehicle, and based on time (for example, $5 would be charged during certain hours (such as peak hours) and $2 would be charged during other hours.

Figure 4:
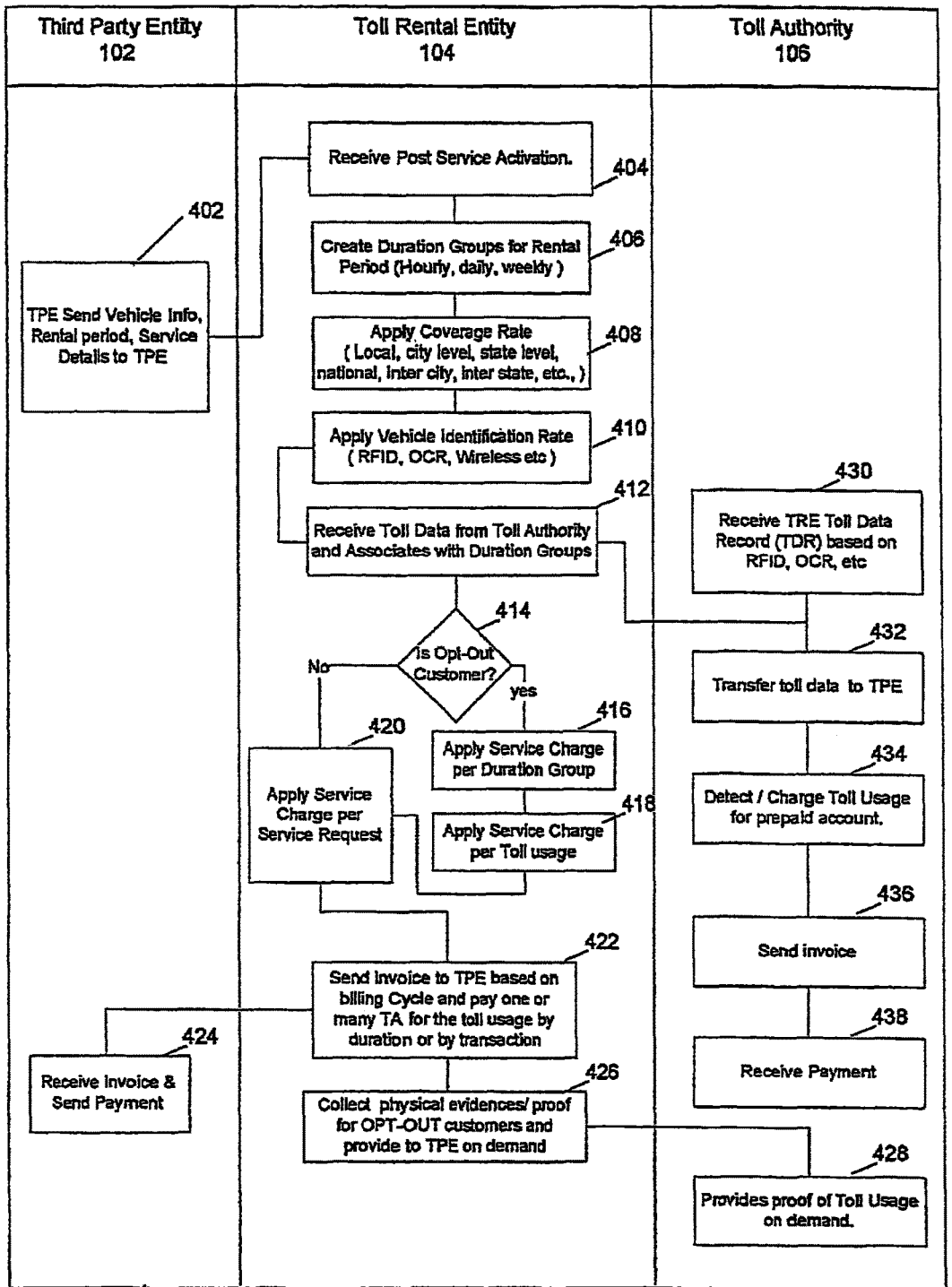
FIG. 4 is a flow chart illustrating billing and charges in accordance with an embodiment of the present invention.

FIG. 4 depicts a flow chart 400 illustrating a billing and charge process. At step 402, the third party entity 102 sends 402 vehicle information, a rental period, and service details to the toll rental entity 104 which receives a post service activation at step 404, creates duration groups for the rental period (which may be for any time increment such as hourly, daily, or weekly) at step 406, applies coverage rates (based on such areas: local, city level, state level, national, inter city, inter state, etc.) at step 408, apply a vehicle identification rate (based on RFID, OCR, other wireless capability, etc.) at step 410, and receive toll data from the toll authority and associate with duration groups at step 412.

At step 414, a check is made to determine if a customer renting the vehicle is an opt-out customer. If the customer is an opt-out customer, the process applies a service charge per duration group at step 416, and applies a service charge per toll usage at step 418. If the customer is not an opt-out customer, and/or after the service charge per toll usage is applied at step 418, the process applies a service charge per service request at step 420, sends an invoice to the third party entity based on a billing cycle and pays one or more toll authorities for the toll usage by duration and/or by transaction at step 422. At step 424, the third party entity receives an invoice and sends a payment, and at step 426, the toll rental entity, collects physical evidence or proof of toll usage for opt-out customers and provides such evidence or proof on demand to the toll authority.

At step 430, the toll authority receives the toll rental entities' toll data record(s) based on (based on RFID, OCR, other wireless capability, etc.), transfers toll data to the third party entity at step 432, detects and/or charges a toll usage to a prepaid account at step 434, sends an invoice at step 436, and receives a payment at step 438.

Figure 5:
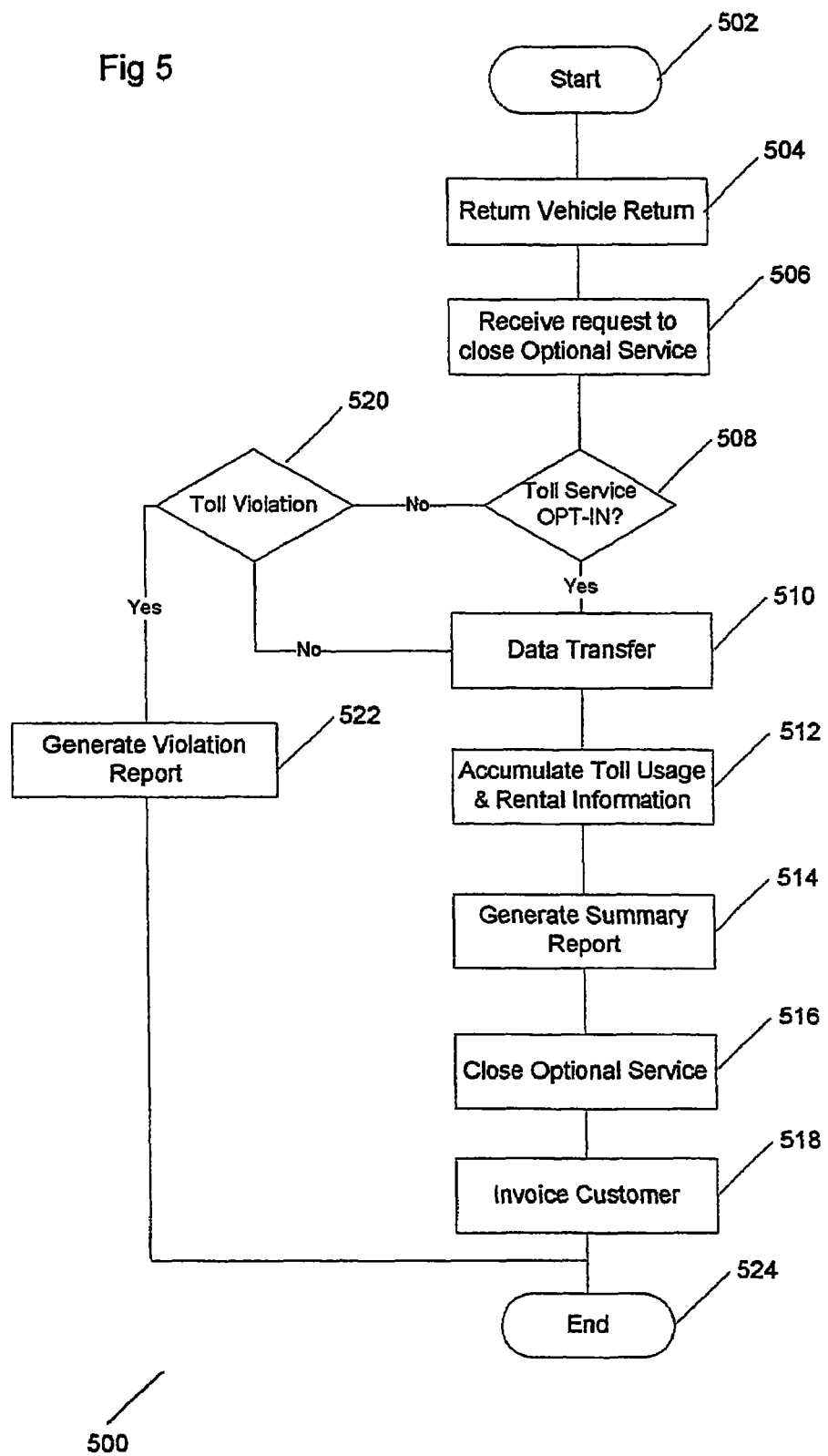
FIG. 5 is a flow chart illustrating invoicing a customer in accordance with an embodiment of the present invention.

FIG. 5 is a flow chart 500 illustrating invoicing a customer and begins 502 by returning a vehicle 504, and receiving a request to close an optional service at step 506. At step 508 a check is made to determine if an opt-in for a toll service has occurred. If it has, data is transferred 510, toll usage a rental information is accumulated 512, a summary report can be generated 514, the optional service is closed 516, the customer is invoiced 518 and the process ends 524. If an opt-in for a toll service has not occurred, a check is made to determine if a toll violation has occurred. If it has not, the process proceeds to the data transfer 510. If it has, a violation report is generated and the process ends 524.

Figure 6:
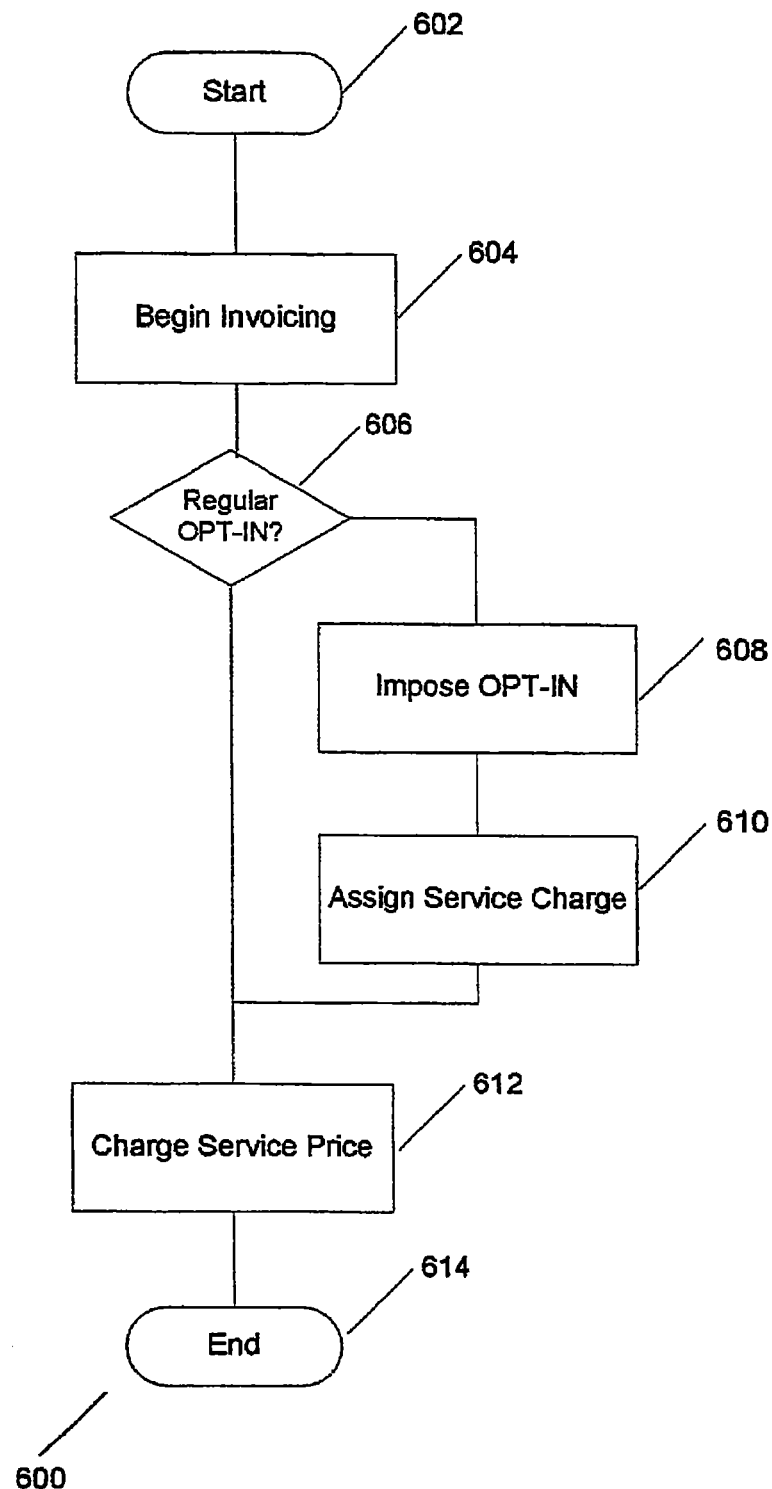
FIG. 6 is a flow chart illustrating providing a service charge in accordance with an embodiment of the present invention.

FIG. 6 is a flow chart 600 illustrating providing a service charge at starts 602 by beginning invoicing 604, and determining if a regular opt-in has occurred 606. If it has, a normal service price is charged 612 at the process ends. If it has not, an opt-in is imposed 608 and a service charge is assigned 610 before the normal service price is charged 612.

Figure 7:
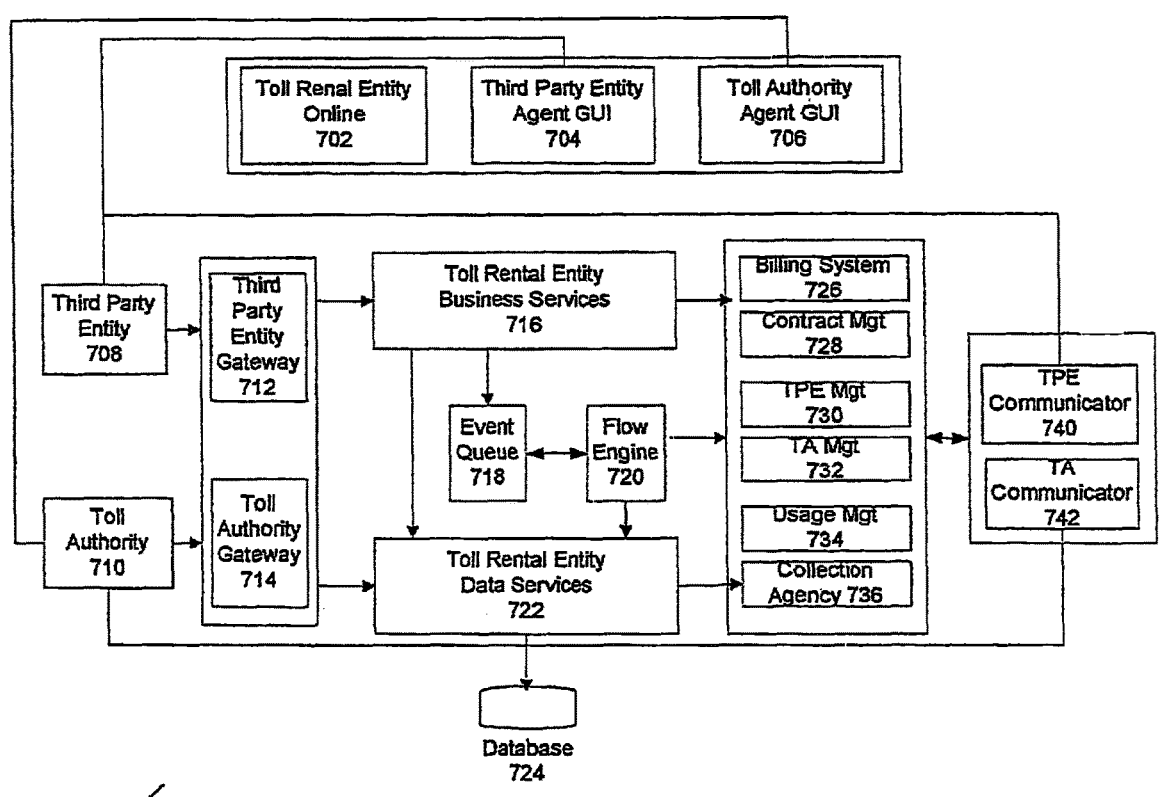
FIG. 7 is a block diagram of a system in accordance with an embodiment of the present invention.

FIG. 7 is a block diagram of a system 700 that comprises a third party entity 708, a toll authority 710, and a toll rental entity 716 and 722. These elements include an on-line or graphical user interface (GUI) via a third party entity agent GUI 704, a toll authority agent GUI 706, and a toll rental entity site 702. The third party entity 708 and the toll authority 710 are connected to respective gateways 712 and 714. In alternate embodiments, these connections may be wireless and may be made to other elements that connect to the toll rental entity 716 and 722. The toll rental entity business services module 716 receives the rental agreements from the third party entity and toll usages from the toll authority/toll collection entity processes the information based on the matched or unmatched and also opt-in, opt-out, late opt-in/opt-out, early opt-in/opt-out of the transactions. The toll rental entity business services module 716 utilizes the event queue 718 and the toll rental entity data services module 722 for queuing the data persistence. The workflow engine 720 gets the notification from the event queue and based on the event queue business process will be executed. The workflow engine 720 uses billing system 726, a contract management module 728, a third party entity management system 730, a toll authority management system 732, a usage management system 734 and a collection agency module 736 for process execution. One or more of these elements may be positioned in different areas within the system and the functionality provided by two or more of these elements may be provided by one of these elements. Components 716, 720, and 722 use billing system 726, contract management module 728, the third party entity management system 730, the toll authority management system 732, the usage management system 734 and the collection agency module 736 for the business process implementation and execution.

Figure 8:
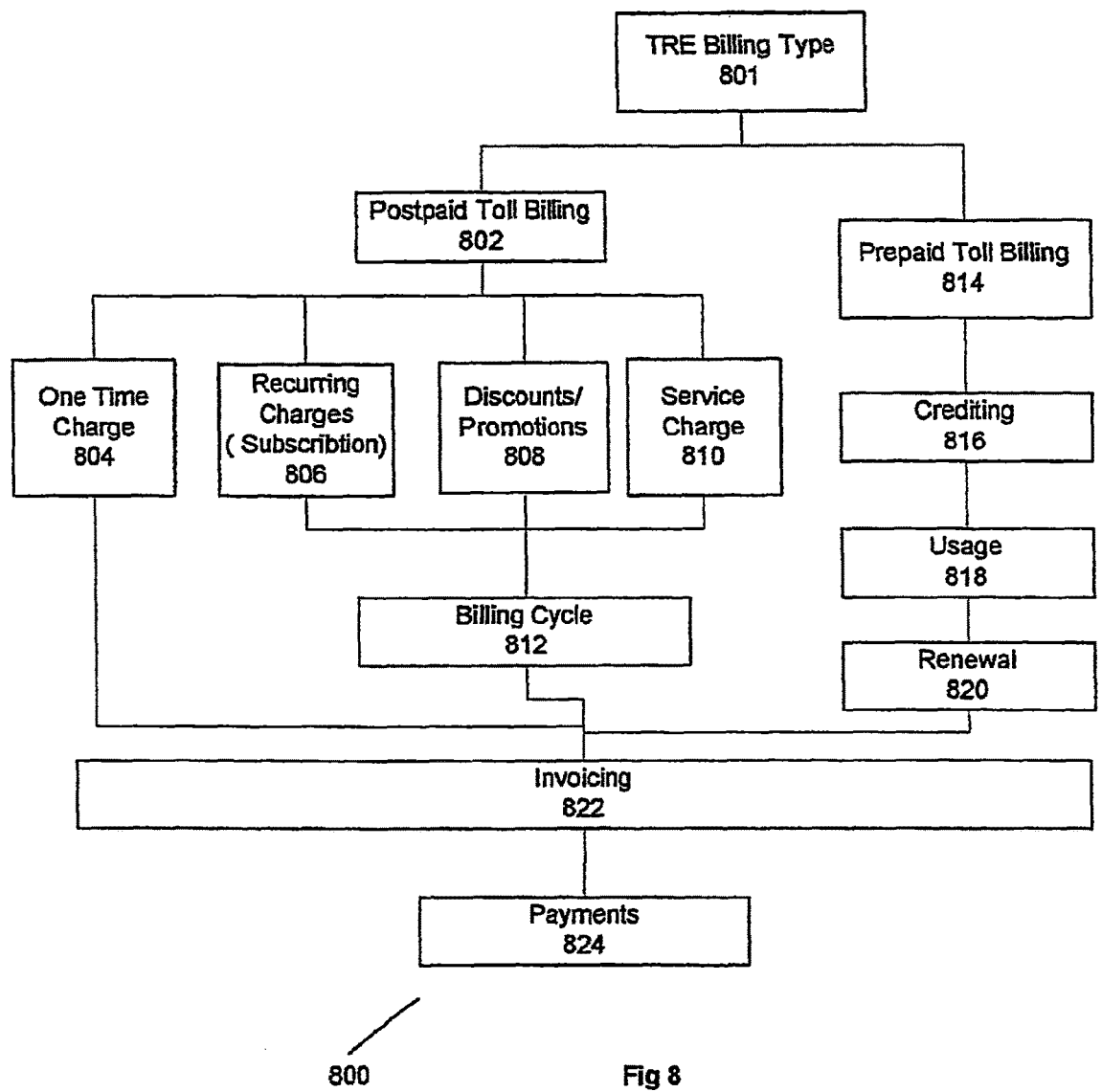
FIG. 8 is a block diagram of an invoicing and payment system in accordance with an embodiment of the present invention.

FIG. 8 is a block diagram of an invoicing and payment system 800 contained within or interfaces with a toll rental entity that comprises a toll rental entity billing type module 801, which comprises a postpaid toll billing module 802 and a prepaid toll billing module 814. The postpaid toll billing module 802 includes a one time charge module 804, a recurring charges (subscription) module 806, a discounts/promotions module 808, and a service charge module 810. The recurring charges module 806, the discounts/promotions module 808, and the service charge module 810 are coupled to a billing cycle module 812 which, along with the one time charge module 804, are coupled to the invoicing module 822.

The prepaid toll billing module 814 is coupled to the invoicing module 822, via a crediting module 816, a usage module 818, and a renewal module 820. A payments module 824 is also coupled to the invoicing module. It is important to note that these modules can be alternately positioned and that the functionality performed by one of these modules may be performed by another one of these modules in conjunction with or in lieu of the functionality performed by the one module.

Although an exemplary embodiment of the system of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the described or depicted elements. Also, these capabilities may be performed in the current manner or in a distributed manner and on, or via, any device able to provide and/or receive information. Further, although depicted in a particular manner, various modules or blocks may be repositioned without departing from the scope of the current invention. For example, information being sent to the toll rental entity can be sent to the third party entity or to multiple third party entities or may be sent to one of the entities in lieu of the other. Still further, although depicted in a particular manner, a greater or lesser number of elements and connections can be utilized with the present invention in order to accomplish the present invention, to provide additional known features to the present invention, and/or to make the present invention more efficient. For example, a cellular phone, RFID chip or other electronic device can be used to send, receive, and/or store any of the data described or depicted herein. Also, the information sent between various elements described or depicted herein, can be sent via a wireless source and/or a wired source and via a plurality of protocols.

Embodiment(s) of the invention will now be described more fully with reference to the accompanying Drawings. The invention may, however, be embodied in many different forms and should not be construed as limited to the embodiment(s) set forth herein. The invention should only be considered limited by the claims as they now exist and the equivalents thereof.

What is claimed is:

1. A method for unlimited toll-utilization, the method comprising:
   utilizing a plurality of processors and servers and at least one radio frequency identification (RFID) transponder and at least one RFID reader to complete the following:
   providing an unlimited toll-utilization service option to a customer via a third-party entity graphical-user interface module;
   responsive to acceptance of the unlimited toll-utilization service option by the customer via the third-party entity graphical-user interface module, enrolling at least one vehicle associated with the customer for the unlimited toll-utilization service by activating a radio frequency identification (RFID) transponder associated with the at least one vehicle for a duration of service, wherein the RFID transponder is configured for RFID communication with an RFID reader equipped at a toll authority;
   collecting, by the RFID reader of the toll authority, toll data upon the at least one vehicle using the toll authority;
   wirelessly transmitting, by the RFID reader to a toll-rental entity computer, the collected toll data;
   wirelessly receiving, by the toll-rental entity computer coupled to a third-party entity computer, information identifying a plurality of vehicles to which the unlimited toll-utilization service option applies;
   wirelessly receiving, by the toll-rental entity computer coupled to the third-party entity computer, the toll data collected by the RFID reader;
   determining, by the toll-rental entity computer coupled to the third-party entity computer, whether the toll data comprises data identifying the at least one vehicle associated with the customer;
   responsive to a positive determination by the toll-rental entity computer, billing the customer via a billing system graphical-user interface;
   wherein the information comprises rental-agreement data for a plurality of customers of the third-party entity that have accepted the unlimited toll-utilization service option; and
   wherein the unlimited toll-utilization service option allows use of a toll authority, via the activated at least one (RFID) transponder, an unlimited number of times for the duration of service for a subscription fee.

2. The method of claim 1, wherein the information comprises fleet data corresponding to a plurality of vehicles operated by a third-party entity.

3. The method of claim 2, wherein the fleet data comprises at least one of:
   a license plate number;
   a license plate state;
   a license state type;
   a vehicle identification number;
   a vehicle owner information;
   a vehicle make;
   a vehicle model; and
   a vehicle color.

4. The method of claim 1, wherein the subscription fee covers unlimited toll usage by a vehicle of the plurality of vehicles.

5. The method of claim 1, wherein the duration of service comprises:
   seconds;
   minutes;
   hours;
   days;
   weeks;
   months; and
   years.

6. The method of claim 1, comprising, responsive to a negative determination, the toll-rental entity billing at least one of:
   the third-party entity; and
   a customer of the third-party entity that is responsible for a vehicle determined to not be one of the plurality of vehicles.

7. The method of claim 6, wherein the billing comprises charging a fee in the amount of at least one of a fee for the unlimited toll-utilization service option and a toll-usage amount.

8. The method of claim 1, comprising, responsive to a negative determination, the third-party entity billing a customer that is responsible for a vehicle determined to not be one of the plurality of vehicles.

9. The method of claim 1, wherein the third-party entity comprises at least one of:
   an entity that rents vehicles;
   an entity that leases vehicles; and
   an entity that loans vehicles.

10. The method of claim 1, wherein the toll-rental entity is a stand-alone unit from the third-party entity.

11. The method of claim 1, wherein the toll-rental entity comprises a server.

12. The method of claim 1, wherein the toll-rental entity is integrated within the third-party entity.

13. The method of claim 1, wherein the toll data comprises at least one of a toll transaction time and a vehicle license-plate number.

14. The method of claim 1, comprising:
   creating a prepaid account between the toll authority and the toll-rental entity; and
   forwarding pre-payment of the prepaid account for future toll usage by the plurality of vehicles.

15. The method of claim 1, wherein the billing is performed by the third party entity.

16. A system comprising:
   a third-party entity configured to provide an unlimited toll-utilization service option to a customer via a third-party entity graphical-user interface module;
   responsive to acceptance of the unlimited toll-utilization service option by the customer via the third-party entity graphical-user interface module, at least one vehicle associated with the customer is enrolled for the unlimited toll-utilization service by activating a radio frequency identification (RFID) transponder associated with the at least one vehicle for a duration of service, wherein the RFID transponder is configured for RFID communication with an RFID reader equipped at a toll authority;
   wherein the RFID reader is configured to collect toll data upon the at least one vehicle using the toll authority and wirelessly transmit the collected toll data to a toll-rental entity computer;
   the toll-rental entity computer interoperably connected to a third-party entity computer that wirelessly receives information identifying a plurality of vehicles to which the unlimited toll-utilization service option applies;
   wherein the toll-rental entity computer wirelessly receives the toll data collected by the RFID reader;
   wherein the toll-rental entity computer determines whether the toll data comprises data identifying the at least one vehicle associated with the customer;
   responsive to a positive determination by the toll-rental entity computer, a third-party entity billing system graphical-user interface bills the customer;
   wherein the information comprises rental-agreement data for a plurality of customers of the third-party entity that have accepted the unlimited toll-utilization service option; and
   wherein the unlimited toll-utilization service option allows use of a toll authority, via the activated at least one (RFID) transponder, an unlimited number of times for the duration of service for a subscription fee.

17. A computer-program product comprising a non-transitory computer-usable medium having computer-readable program code embodied therein, the computer-readable program code adapted to be executed to implement a method for unlimited toll-utilization, the method comprising:
   utilizing a plurality of processors and servers and at least one radio frequency identification (RFID) transponder and at least one RFID reader to complete the following:
      providing an unlimited toll-utilization service option to a customer via a third-party entity graphical-user interface module;
      responsive to acceptance of the unlimited toll-utilization service option by the customer via the third-party entity graphical-user interface module, enrolling at least one vehicle associated with the customer for the unlimited toll-utilization service by activating a radio frequency identification (RFID) transponder associated with the at least one vehicle for a duration of service, wherein the RFID transponder is configured for RFID communication with an RFID reader equipped at a toll authority;
      collecting, by the RFID reader of the toll authority, toll data upon the at least one vehicle using the toll authority;
      wirelessly transmitting, by the RFID reader to a toll-rental entity computer, the collected toll data;
      wirelessly receiving, by the toll-rental entity computer coupled to a third-party entity computer, information identifying a plurality of vehicles to which the unlimited toll-utilization service option applies;
      wirelessly receiving, by the toll-rental entity computer coupled to the third-party entity computer, the toll data collected by the RFID reader;
      determining, by the toll-rental entity computer coupled to the third-party entity computer, whether the toll data comprises data identifying the at least one vehicle associated with the customer;
      responsive to a positive determination by the toll-rental entity computer, billing the customer via a billing system graphical-user interface;
      wherein the information comprises rental-agreement data for a plurality of customers of the third-party entity that have accepted the unlimited toll-utilization service option; and
      wherein the unlimited toll-utilization service option allows use of a toll authority, via the activated at least one (RFID) transponder, an unlimited number of times for the duration of service for a subscription fee.

18. The non-transitory computer-readable medium of claim 17, wherein the subscription fee covers unlimited toll usage by a vehicle of the plurality of vehicles.

19. The non-transitory computer-readable medium of claim 17, comprising, responsive to a negative determination, the toll-rental entity billing at least one of:
   the third-party entity; and
   a customer of the third-party entity that is responsible for a vehicle determined to not be one of the plurality of vehicles.

20. The non-transitory computer-readable medium of claim 17, wherein the billing is performed by the third party entity.

* * * * *